US012698889B2

(12) United States Patent
Illueca Bel

(10) Patent No.: US 12,698,889 B2
(45) Date of Patent: Aug. 4, 2026

(54) LIGHTING DEVICE AND SYSTEM FOR EMITTING AMBIENT LIGHT AND DIRECT LIGHT

(71) Applicant: ANTARES ILUMINACIÓN, S.A.U., Valencia (ES)

(72) Inventor: Pablo Illueca Bel, Valencia (ES)

(73) Assignee: ANTARES ILUMINACION, S.A.U., Valencia (ES)

( * ) Notice: Subject to any disclaimer, the term of this patent is extended or adjusted under 35 U.S.C. 154(b) by 0 days.

(21) Appl. No.: 19/353,135

(22) Filed: Oct. 8, 2025

(65) Prior Publication Data

US 2026/0110424 A1 Apr. 23, 2026

(30) Foreign Application Priority Data

Oct. 17, 2024 (EP) ..................................... 24383137

(51) Int. Cl.

| | |
|---|---|
| ***H05B 47/19*** | (2020.01) |
| ***F21S 8/04*** | (2006.01) |
| ***F21S 8/06*** | (2006.01) |
| ***F21V 3/02*** | (2006.01) |
| ***F21V 3/04*** | (2018.01) |
| ***F21V 15/01*** | (2006.01) |
| ***F21V 21/005*** | (2006.01) |
| ***F21V 21/008*** | (2006.01) |
| ***F21V 21/30*** | (2006.01) |
| ***F21V 23/00*** | (2015.01) |

(Continued)

(52) U.S. Cl.

CPC .............. *F21V 21/30* (2013.01); *F21S 8/046* (2013.01); *F21S 8/06* (2013.01); *F21V 3/02* (2013.01); *F21V 3/049* (2013.01); *F21V 15/01* (2013.01); *F21V 21/005* (2013.01); *F21V 21/008* (2013.01); *F21V 23/006* (2013.01); *F21V 23/02* (2013.01); *F21V 23/045* (2013.01); *F21V 23/06* (2013.01); *H05B 47/155* (2020.01); *H05B 47/19* (2020.01); *F21Y 2115/10* (2016.08)

(58) Field of Classification Search

CPC ........... F21S 8/046; F21S 8/06; F21V 21/008; F21V 23/006; F21V 23/02; F21V 23/045; F21V 21/30; F21V 3/02; F21V 3/049; F21V 15/01; F21V 21/005; F21V 21/025; H05B 47/19; H05B 47/155; F21Y 2115/10

See application file for complete search history.

(56) References Cited

U.S. PATENT DOCUMENTS

2017/0227171 A1* 8/2017 May .......................... F21S 8/04
2018/0202642 A1* 7/2018 Martinez Weber ..... F21S 8/038

(Continued)

*Primary Examiner* — Omar Rojas Cadima
(74) *Attorney, Agent, or Firm* — Hayes Soloway P.C.

(57) ABSTRACT

Lighting device for emitting ambient light and direct light, which is a bar-shaped device, includes a longitudinal body having two side walls that on their outer sides have light strips and diffusers that emit ambient light, an upper channel where the components for controlling light emission are housed, and an inverted U-shaped inner housing where luminaires emitting direct light are housed; and a longitudinal covering, which is a closing profile; where the cover is fixed by pressure on the upper part of the body; and a lighting system including a plurality of lighting devices; a plurality of luminaires that are fixed in the inner housing of the device; and where the lighting devices have connector covers at their ends to generate a line of light.

15 Claims, 7 Drawing Sheets

(51) Int. Cl.

| | |
|---|---|
| ***F21V 23/02*** | (2006.01) |
| ***F21V 23/04*** | (2006.01) |
| ***F21V 23/06*** | (2006.01) |
| ***H05B 47/155*** | (2020.01) |
| *F21Y 115/10* | (2016.01) |

(56) References Cited

U.S. PATENT DOCUMENTS

2021/0048152 A1* 2/2021 Parker .................. F21V 7/0016
2023/0160546 A1* 5/2023 Martinez Weber ..... F21S 2/005
362/217.01

* cited by examiner

LIGHTING DEVICE AND SYSTEM FOR EMITTING AMBIENT LIGHT AND DIRECT LIGHT

CROSS-REFERENCE TO RELATED APPLICATIONS AND PRIORITY

This patent application claims priority from European Patent Application No. 24383137.7 filed on Oct. 17, 2024. This patent application in herein incorporated by reference in its entirety.

FIELD OF THE INVENTION

The present disclosure includes a lighting device which is bar-shaped and is provided with means to emit ambient light in a controlled manner, and in turn, allows the coupling of direct light points along its length in a simple manner and without the need to disassemble the bar. In turn, the present invention allows various linear shapes to be generated, allowing it to be hung from the ceiling or fixed directly thereto, that is, the invention also includes a lighting system that allows both ambient light and direct light to be emitted.

This invention falls within the different types of lighting equipment and systems.

STATE OF THE ART

It is known within this industrial sector that ambient light is a type of light that provides basic visibility in any space that, unlike direct light, does not produce shadows or glare, that is, it is a type of lighting that serves to see a space as a whole with a dim light base. For this reason, in general, this type of light is projected by luminaires with light points or point projectors, such as ceiling lamps, floor lamps or table lamps that are provided with a bulb or spotlight that dims the light.

In this regard, ambient light is mainly used to create different atmospheres and environments; but, although in a certain way all types of light serve in one way or another to create environments, in ambient lighting, aspects such as the colour of light or the design of the luminaires become more important. In this regard, it is also known that known ambient lighting devices can comprise projectors that are programmable to emit different colours or intensities.

Additionally, it is known that, to illuminate large rooms, a plurality of different lighting devices are currently installed, with one or several light points, which are previously programmed. This means that current installations for emitting ambient light are designed for small rooms, or designed to illuminate a specific area within a large room, given that lighting an entire large room involves a high installation cost of a large number of lighting devices, each with its own assembly.

Taking into account all the arguments previously set out, it is considered that there is no solution to the technical problem of being able to have a lighting system that allows ambient light to be provided for large rooms, where this system is based on a lighting device that allows ambient light to be emitted, but at the same time, is provided with means to be able to attach spotlights or rails that emit direct light. Currently, in order to illuminate a room with ambient light and direct light, two independent installations must be implemented, and as previously mentioned, in the case of large rooms, there is also no known effective system that can cover the entire space.

In this context, the applicant is not aware of any lighting device that emits ambient light that can, on its own, cover large rooms and that allows different types of ambient light to be projected in a controlled manner, such as wall washer light; batwing light distribution; and in turn, that allows direct light to be emitted, also in a controlled manner, with direct light points such as spotlights or light rails, which can be used to emit direct light such as accent light or task lighting. The present invention is aimed at resolving these limitations existing in the state of the art.

In order to overcome the problems and limitations existing in the state of the art, the present invention is based on a lighting device which is bar-shaped, comprising light strips provided with a means to dim the emitted light and project ambient light along the entire bar, which allows a greater amount of ambient light to be emitted than a point device and which allows, for example, light to be projected onto an entire wall, and where, unlike for example a lamp, different bars can be joined linearly to cover large rooms; and, in turn, the bar is provided with means so that spotlights, light rails or light points that emit direct light can be fixed to it, also in a controlled manner. This lighting device has the particularity of being provided with means to operate independently, therefore, although there is a system that comprises a plurality of these devices connected linearly to each other, in reality, a user can configure and control the emission of both ambient light, direct light or a combination of both types of light as required.

The applicant is not aware of any lighting device or system that is either similar or as advantageous as the one described and claimed below.

DESCRIPTION OF THE INVENTION

The invention is a novel type of lighting device that resolves, in its different embodiments, the problems and limitations present in the state of the art previously raised.

The lighting device object of the present invention is bar-shaped and comprises a longitudinal body, which is a support profile for the different elements for the projection of ambient light, direct light and their control means, a body comprising two side walls that on their outer sides have light strips and diffusers that emit ambient light, an upper channel and an inverted U-shaped inner housing where luminaires emitting direct light are housed; and a longitudinal covering, which is a closing profile; where the cover is fixed by pressure on the upper part of the body.

The device comprises:

- a side wall on each side of the body, where on the outer face of each side wall is fixed a light strip, which is arranged longitudinally along the entire wall of the body
- a first diffuser which is fixed to the outer face of each side wall and is superimposed on the light strip along the entire wall of the body;
- a second diffuser which is fixed to the outer face of each side wall and is superimposed on the first diffuser along the entire wall of the body;
- an open channel arranged in the upper part of the body, where said channel comprises a programmable control module and a power supply module comprising an electrical connection with a power source; where the programmable control module comprises an electronic board of the PCB type, a remote communication submodule and is connected to the light strips; and where the power supply module is connected to the control module and to the light strips; and where the fixing of the cover to the body closes the channel and protects the aforementioned components;

an inverted U-shaped inner housing generated by the inner faces of the side walls of the body, the housing comprising a longitudinal support plate that fits into the upper part of the housing, which is a plate that is connected to the programmable control module and the power supply module, and which comprises a magnetic medium and has an upper face covered with insulating material and a lower face provided with a graphite sheet with at least two longitudinal electrical contact lines along the entire body;

a protective piece of an electrical conductor arranged on the upper part of each inner face, which is a piece of rigid polymer;

and an electrical copper conductor arranged in each protective piece, which generates an electrical power line on both inner faces of the side walls along the entire body.

Going into greater detail, in a preferred embodiment of the invention, each side wall of the body, specifically on its outer face, has a longitudinal groove generated by two T-shaped projections, one upper and one lower, where the light strip arranged longitudinally along the entire wall of the body is fixed in said groove. These projections, in turn, allow the hooking of the first diffuser arranged longitudinally along the entire wall of the body, whose section is preferably curved and with smooth faces, and where this first diffuser is superimposed on the strip, and where the first diffuser comprises slits at its ends where the projections fit.

The outer face of the side wall of each side of the body, in a preferred embodiment of the invention, also comprises another set of protrusions, one above the upper projection and another below the lower projection, for the hooking of the second diffuser arranged longitudinally along the entire wall of the body and superimposed on the first diffuser, for which the second diffuser comprises slots at its ends where the protrusions fit. In a possible embodiment of the invention, the second diffuser has a curved section, where the outer face is striated and the inner face is smooth. In another possible embodiment of the invention, the second diffuser has a C-shaped section with straight edges, where the outer face is striated and the inner face is smooth. One of the particularities of the invention lies in that the striated surface of the outer face of the second diffuser allows the diffused projection of the emitted light to be improved, given that the configuration of said striations, whether by dimensions, number and/or separation, allows the orientation of the different light beams of the light emitted by the light strip to be regulated and adapted.

On the other hand, the inner face of the side wall, on both sides, comprises a notch in its upper part and a rib arranged at mid-height, a rib that comprises a rim, and where the notch and the rim generate a longitudinal recess where the protective piece of the electrical conductor is fitted. In turn, the longitudinal electrical connection support plate over the protective pieces and fitted by pressure on the top part of the inner housing.

The invention is designed so that a user can place direct light luminaires, such as a directional spotlight or a light rail, as desired along the inner housing, and they can be moved along the longitudinal direction of said housing. Specifically, the luminaires comprise a magnetic medium that allows them to be arranged and fixed in the inner housing, and they comprise an electronic board in their upper part, which remains in contact with the longitudinal support plate, and they comprise electrical contacts, which can be at the top and remain in contact with the longitudinal electrical contact lines of the plate, or they can have lateral electrical contacts that remain in contact with the electrical copper conductors arranged on each lateral inner face.

The body comprises an open longitudinal channel at its upper part, where the closure of the cover with the body generates a longitudinal compartment, and where in said channel there is a PCB type electronic board connected to the light strips and luminaires and a power supply module that supplies both the PCB and the light strips. The power supply module is connected to a power source, which can be via a direct connection to a transformer arranged in a casing over the cover and which allows the bar to be fixed directly to the ceiling of the room, or via connecting cables to a power source integrated into ceiling hangers, which allow the bar to be hung from the ceiling of the room.

The invention has the particularity that the control module can be programmed so that each light strip emits ambient light independently, that is, the device can be programmed so that the light strip on one side emits a light at a different intensity than that on the other side, so as to improve the lighting of an area of a wall; and it is programmed so that each luminaire emits direct light independently. For this purpose, the control module can comprise a wireless connection submodule with an external electronic device, preferably a Bluetooth type connection, and where a user can manage said lighting in a personalised manner using computer tools. This allows a user to program the lighting device object of the present invention so that it can emit ambient light on both sides, differentiated ambient light on both sides, direct light with luminaires, or a combination of ambient light and direct light. This also provides the advantage of being able to emit light in a programmed and controlled manner at 360°. It is true that there are commercial devices that allow light to be emitted at 360°, but they have the limitation of being a light of uniform intensity; however, the present invention allows illumination at 360° with different intensities according to programming, being able to manage the emission of light as desired.

Furthermore, the invention has the particularity that each bar-shaped device can be linearly connected to other bars by means of connector covers arranged at their ends, thus generating a line of light. These connector covers can have multiple shapes, such as closed covers that enable a lighting system with a straight longitudinal shape, either with the bars fixed directly to the ceiling or hanging from the ceiling; or they can be covers with a joint that allows a non-straight longitudinal shape to be generated, either with the bars fixed directly to the ceiling or hanging from the ceiling; or even the union of a horizontal bar hanging from the ceiling with another vertical bar fixed to the ceiling. This versatility, which allows the existing limitations in known installations to be overcome, is possible because each lighting device comprises a PCB independent of the rest that gives it autonomy with respect to any other bar in the system, therefore, the connectors do not require electrical connection elements, and the different bars can be programmed so that together they emit a particular ambient light for each room. This versatility improves the projection of ambient light in large rooms, with the advantage, compared to known systems, of not having to carry out multiple installations of specific projection devices.

Therefore, the present invention also consists of a system, comprising at least two lighting devices as defined previously, where each device comprises a light strip that emits ambient light on each side of its body and at least one luminaire that emits direct light arranged in the inner housing; where these devices are linearly connected to each other by connector covers, which can comprise a joint such as a ball joint to generate a line of light, these lines being able to have a straight shape or with changes of direction, either horizontal or vertical; and where each luminaire emits ambient light and direct light independently and in a controlled manner to the others.

The present invention, compared to known devices, allows a single device to emit ambient light, direct light or a combination of both as desired, for which it has been necessary to develop a structure that allows for the provision of light strips and lateral diffusers that allow ambient light to be emitted, while also allowing the installation of point luminaires that emit direct light, all in a single device and all being controlled.

Additionally, the present invention, compared to known systems, allows the problems and limitations of illuminating large rooms to be overcome without the need to differentiate, on the one hand, between an installation intended to emit ambient light and, on the other hand, an installation intended to emit direct light. This means that the system comprises lighting devices that are independent of each other, each with its own power supply and its own control module that allows a user to manage and activate the light emitted as desired. In addition, the connectors allow different devices to be connected at different angles, allowing devices to be connected in a hanging manner, either linearly or non-linearly, allowing two devices to be connected, one hanging and the other fixed to the ceiling, or allowing devices to be connected fixed directly to the ceiling.

In a preferred embodiment of the invention, the light strip is of the LED type, although this is not intended to be limiting, therefore, the strip can be of any other commercial type.

The material of the diffusers can be polycarbonate, polypropylene, acrylic material or any other type of commercial diffuser.

Likewise, the materials of the rest of the different elements of the device can be made of any resistant material such as, for example, of a plastic, polymeric or metallic nature, or a mixture of several of them.

It should be noted that, throughout the description and claims, the term "comprises" and its variants are not intended to exclude other technical features or additional elements.

BRIEF DESCRIPTION OF THE FIGURES

In order to complete the description and to help make the features of the invention more readily understandable, a set of figures and drawings is presented wherein the following is represented by way of illustration and not limitation.

DETAILED DESCRIPTION OF EMBODIMENTS OF THE INVENTION

Figure 1:
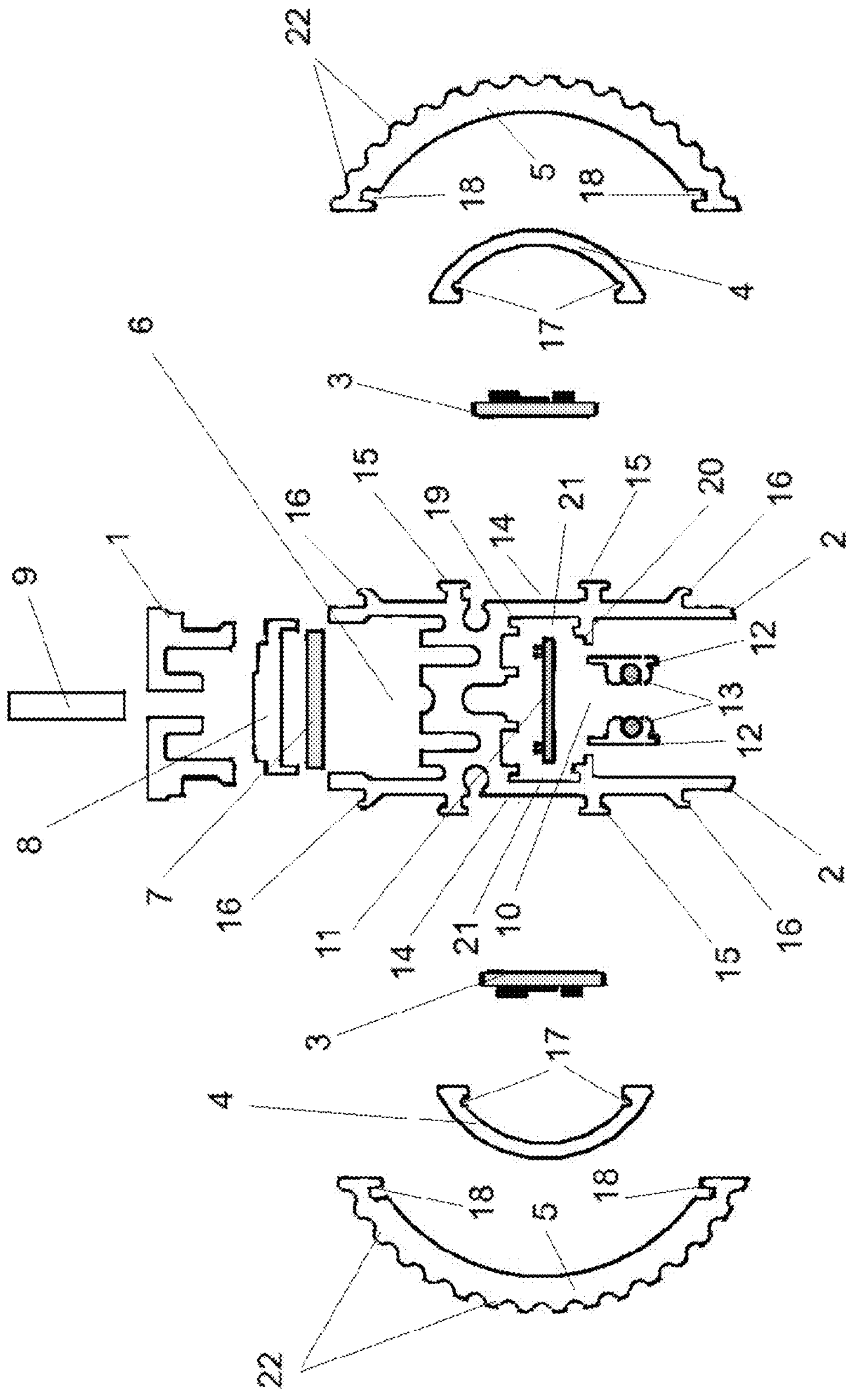
FIG. 1.—Shows a schematic view of an exploded section of an embodiment of the device object of the present invention.
Figure 2:
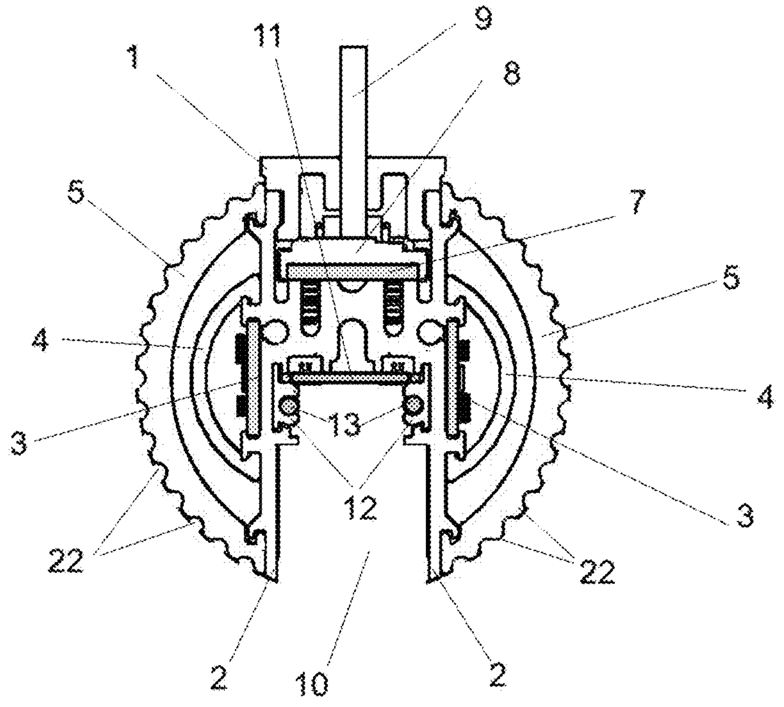
FIG. 2.—Shows a cross-sectional view of an embodiment of the device of the invention with a second curved diffuser.
Figure 3:
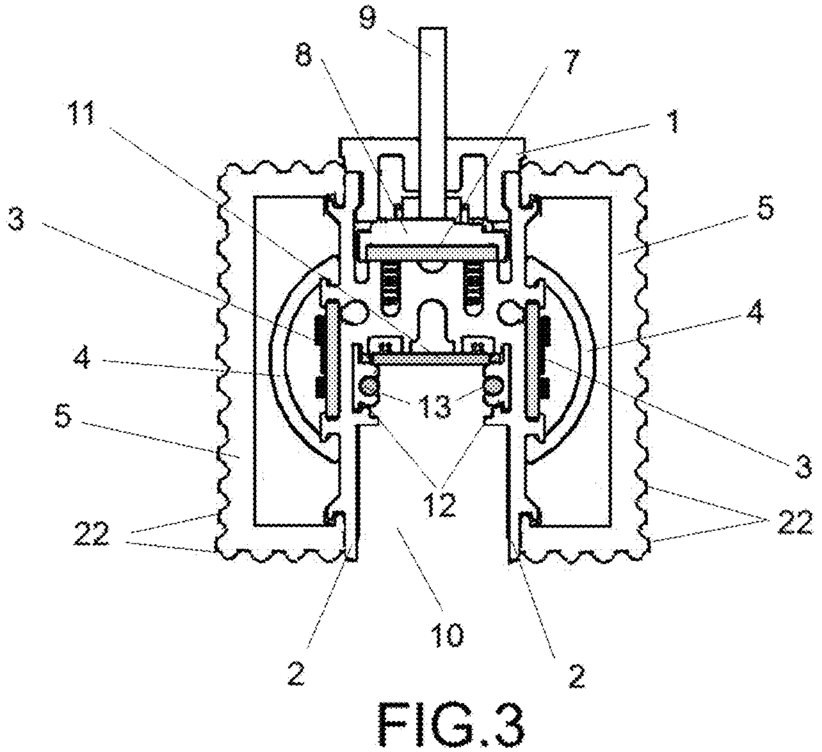
FIG. 3.—Shows a cross-sectional view of an embodiment of the device of the invention with a second diffuser having C-shaped faces with straight edges.
Figure 4:
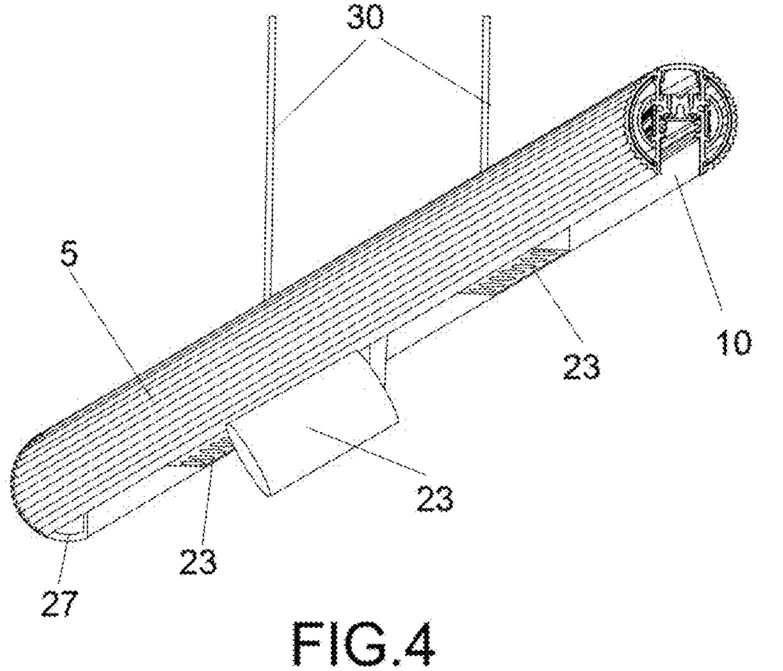
FIG. 4.—Shows a perspective view of a lighting device that hangs from the ceiling with its sides emitting ambient light and in whose inverted U-shaped inner housing are fixed two luminaires, which are a light rail and a luminaire that is an adjustable spotlight, where these luminaires emit direct light.
Figure 5:
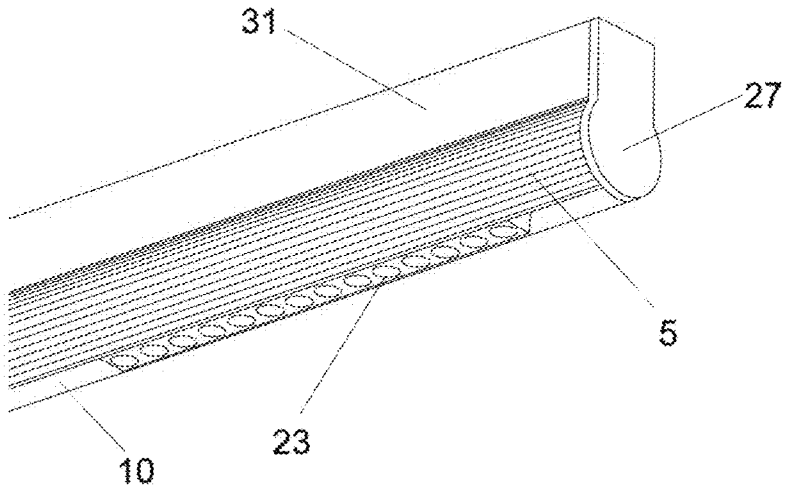
FIG. 5.—Shows a perspective view of a lighting device that is fixed to the ceiling with its sides emitting ambient light and in whose inverted U-shaped inner housing there is a luminaire that is a light rail that emits direct light.
Figure 6:
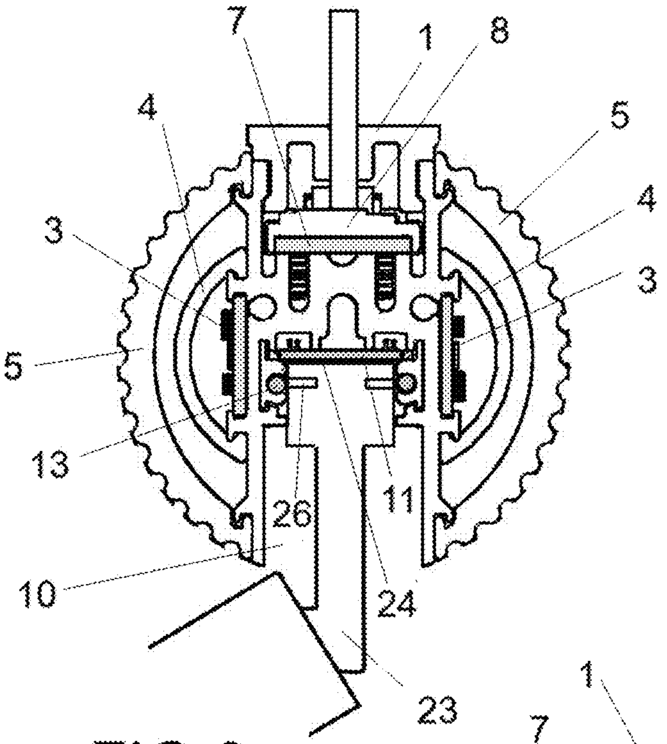
FIG. 6.—Shows a cross-sectional view of an embodiment of the device of the invention with a second curved diffuser and wherein a luminaire that is an adjustable spotlight is fixed in the inverted U-shaped inner housing.
Figure 7:
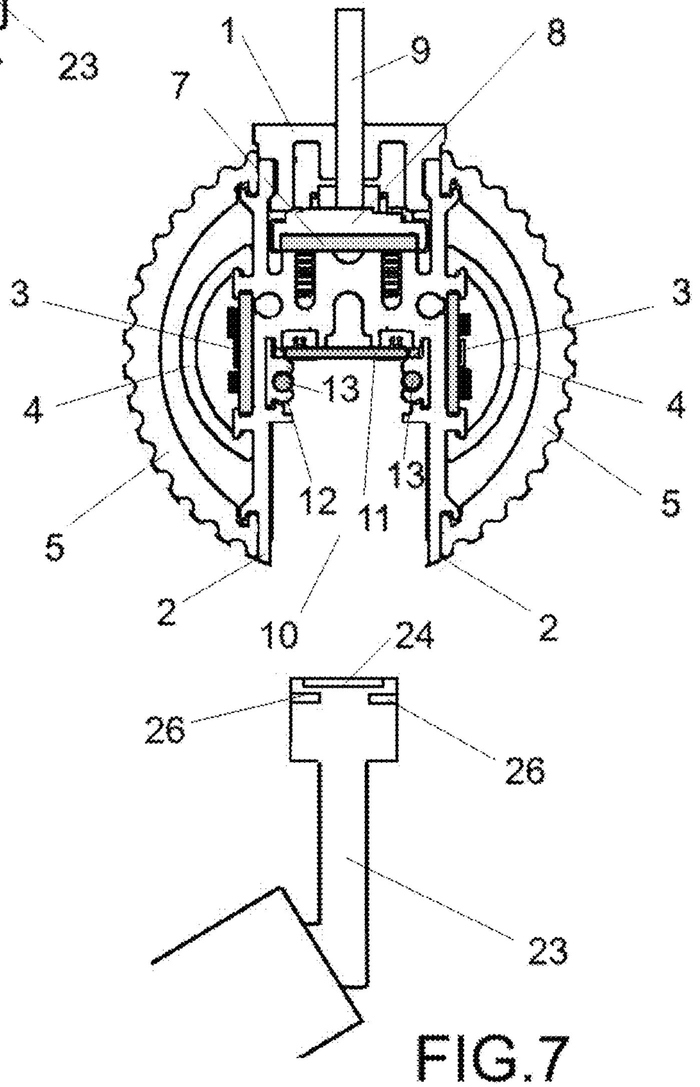
FIG. 7.—Shows a schematic and exploded view of the previous figure.
Figure 8:
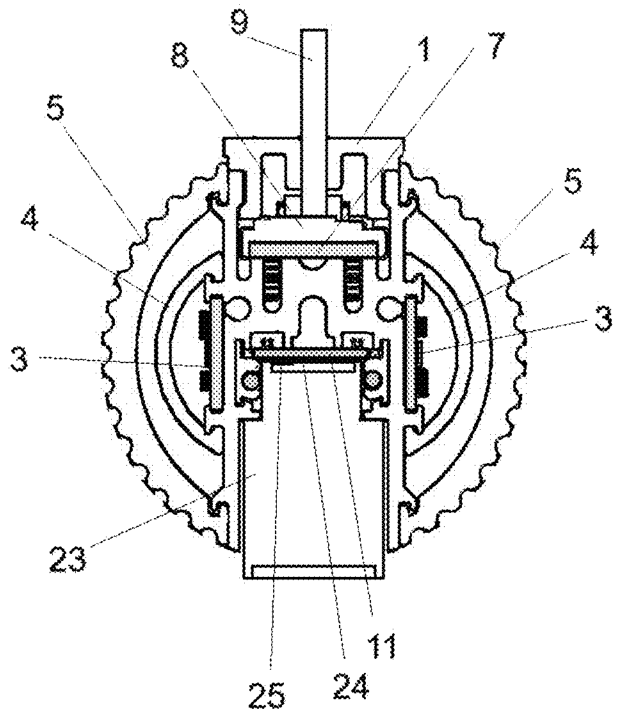
FIG. 8.—Shows a cross-sectional view of an embodiment of the device of the invention with a second curved diffuser and wherein a luminaire that is a light rail is fixed in the inverted U-shaped inner housing.
Figure 9:
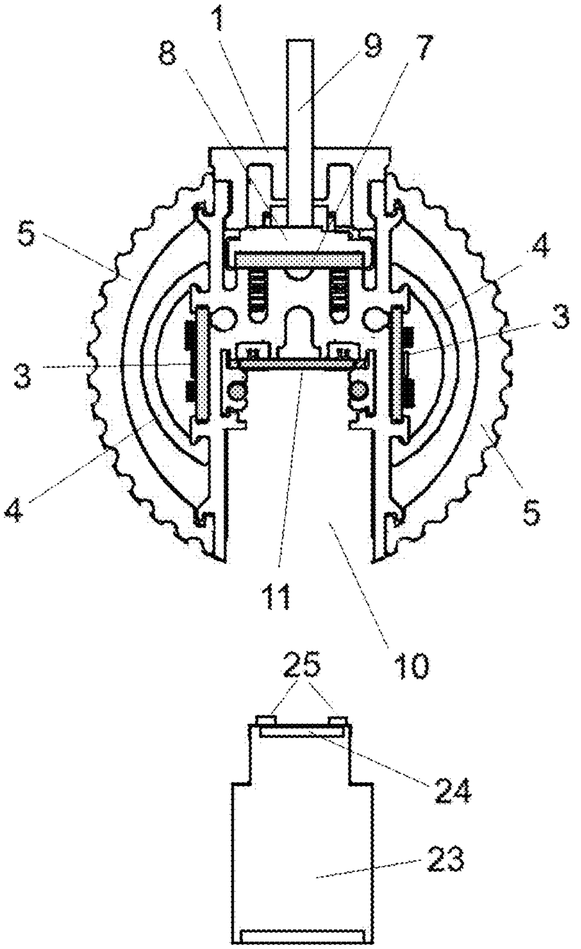
FIG. 9.—Shows a schematic and exploded view of the previous figure.
Figure 10:
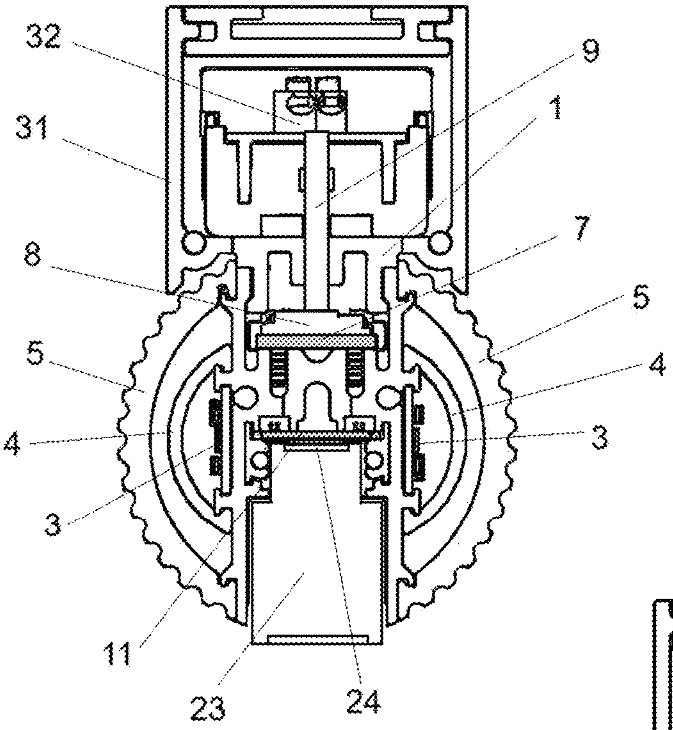
FIG. 10.—Shows a cross-sectional view of an embodiment of the device of the invention with a second curved diffuser and wherein a luminaire that is a light rail is fixed in the inverted U-shaped inner housing, the electrical connection of the power supply module being directly connected to a transformer arranged in a casing over the cover of the body, and where the casing is fixed directly to the ceiling.
Figure 11:
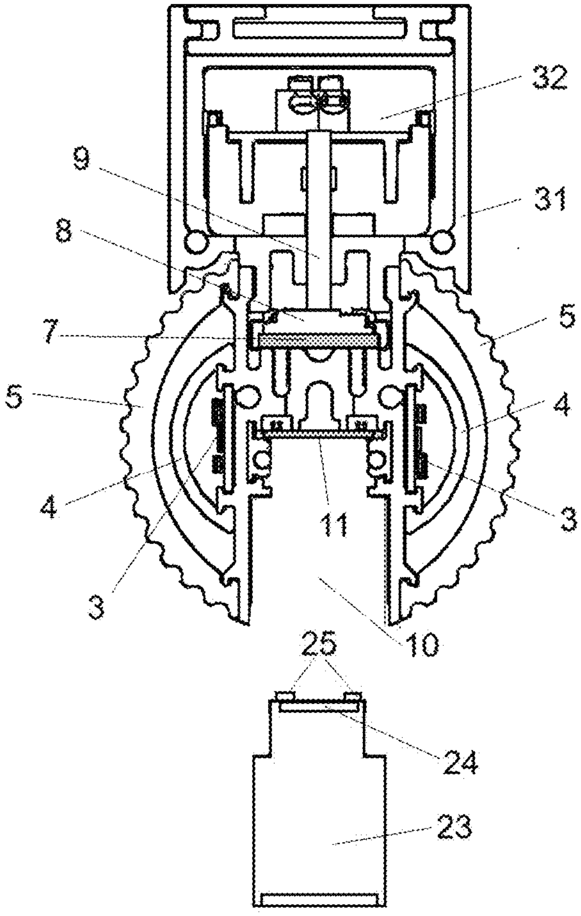
FIG. 11.—Shows a schematic and exploded view of the previous figure.
Figure 12:
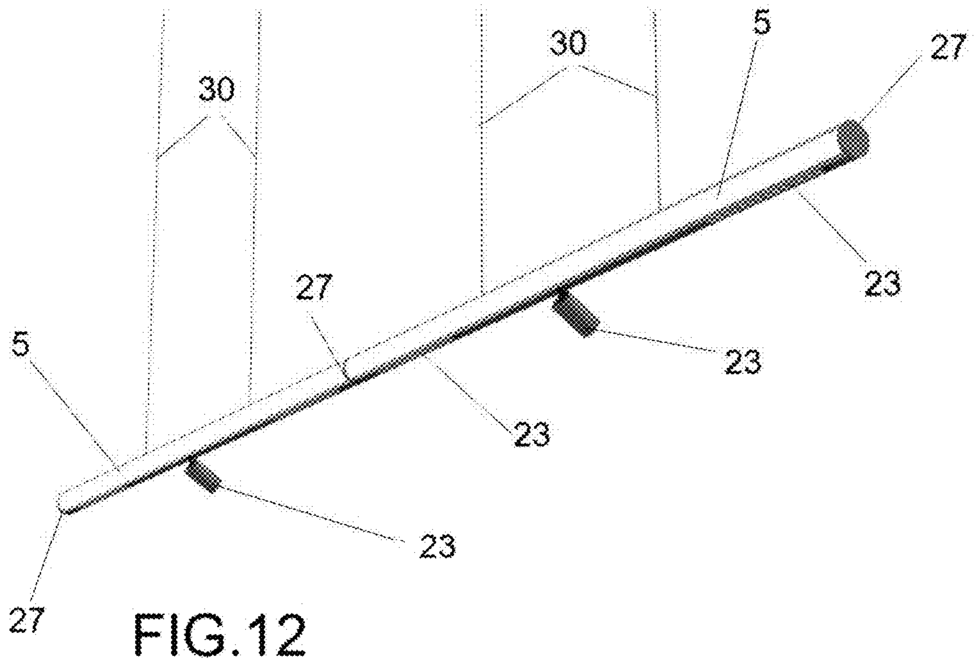
FIG. 12.—Shows a perspective view of a lighting system comprising two lighting devices where a plurality of luminaires are fixable, both of the light rail type and adjustable spotlights, where these luminaires are connected with straight covers.
Figure 13:
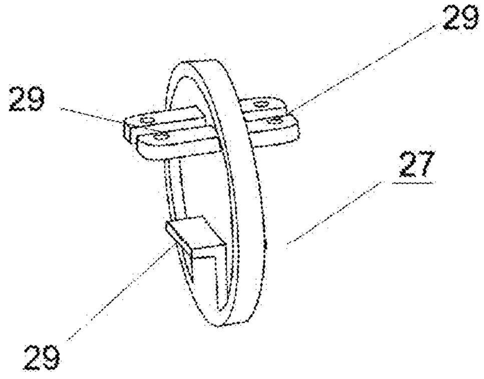
FIG. 13.—Shows a free perspective view of a straight cover for the straight-line connection of different lighting devices, and specifically it is a continuation of straight covers where the fixing projections can be seen on the profile of the body of the device on both faces.
Figure 14:
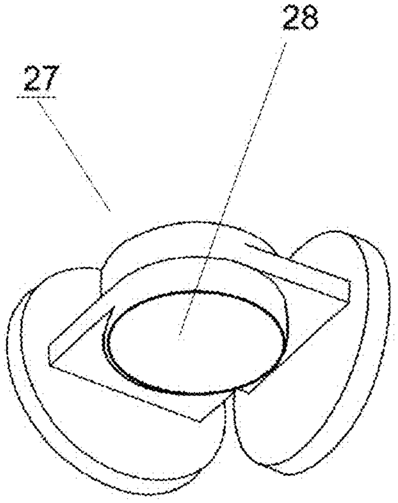
FIG. 14.—Shows a free perspective of a cover with a joint to generate changes in direction in the line of light

The lighting device for emitting ambient light and direct light object of the present invention is a bar-shaped device, which has a longitudinal body and a longitudinal cover (1); where the cover is fixed by pressure on the upper part of the body; and where the device comprises:

- a side wall (2) on each side of the body, where on the outer face of each side wall is fixed a light strip (3), which is arranged longitudinally along the entire wall of the body
- a first diffuser (4) which is fixed to the outer face of each side wall and is superimposed on the light strip (3) along the entire wall of the body;
- a second diffuser (5) which is fixed to the outer face of each side wall and is superimposed on the first diffuser (4) along the entire wall of the body;
- an open channel (6) arranged in the upper part of the body, where said channel comprises a programmable control module (7) and a power supply module (8) comprising an electrical connection (9) with a power source; where the programmable control module comprises an electronic board of the PCB type, a remote communication submodule and is connected to the light strips; and where the power supply module (8) is connected to the control module (7) and to the light strips (3); and where the fixing of the cover (1) to the body closes the channel and protects the aforementioned components;

an inverted U-shaped inner housing (10) generated by the inner faces of the side walls of the body, the housing comprising a longitudinal support plate (11) that fits into the upper part of the housing, which is a plate that is connected to the programmable control module (7) and the power supply module (8), and which comprises a magnetic medium and has an upper face covered with insulating material and a lower face provided with a graphite sheet with at least two longitudinal electrical contact lines along the entire body;

a protective piece (12) of an electrical conductor arranged on the upper part of each inner face;

and an electrical copper conductor (13) arranged in each protective piece, which generates an electrical power line on both inner faces of the side walls along the entire body.

In one embodiment of the invention, and going into greater detail, the device comprises:

a longitudinal groove (14) arranged on the outer face of each side wall (1) which is generated by two T-shaped projections (15), one upper and one lower; and where the side wall comprises a set of protrusions (16), one above the upper projection and another below the lower projection;

where the light strip (3), which is fixed in the groove (14) and arranged longitudinally along the entire wall of the body where the first diffuser (4) whose section is curved, comprises slits (17) at its ends where the projections (15) fit, and where the first diffuser (4) is fixed to the side wall (1), superimposed on the light strip (2) and arranged longitudinally along the entire wall of the body;

where the second diffuser (5) whose section comprises slots (18) at its ends where the protrusions (16) fit and where the second diffuser (5) is fixed to the side wall (2), superimposed on the first diffuser (4) and arranged longitudinally along the entire wall of the body;

where the open channel (6) arranged in the upper part of the body, where in said channel there is arranged a control module (7) and a power supply module (8) comprising an electrical connection (9) with a power source; where the control module (7) comprises an electronic board of the PCB type and a remote communication submodule and is connected to the light strips (3); and where the power supply module (8) is connected to the control module (7) and to the light strips (3);

where the closure of the cover (1) with the body closes the channel (9) and generates a longitudinal closed compartment that protects the control module and the power supply module;

where the inverted U-shaped inner housing (10) generated by the inner faces of the side walls (2) of the body, the housing comprising a notch (19) in its upper part and a rib (20) arranged at mid-height, the rib (20) comprising a rim, and where the notch and the rim generate a longitudinal recess (21) where a protective piece (12) is fitted, and where, in turn, a support plate (11) is arranged on the protective pieces (12) and fitted by pressure onto the upper part of the inner housing (10).

In one embodiment of the invention, the first diffuser (4) has a curved section.

In one embodiment of the invention, the surface of the faces of the first diffuser (4) are smooth.

In one embodiment of the invention, the second diffuser has a curved section, where the outer face is striated (22) and the inner face is smooth.

In one embodiment of the invention, the second diffuser has a C-shaped section with straight edges, where the outer face is striated (22) and the inner face is smooth.

The lighting system for emitting ambient light and direct light comprises:

a plurality of lighting devices as previously defined;

a plurality of luminaires (23) that are fixable in the inner housing (10), luminaires that comprise a magnetic means of fixing with the device, an electronic board (24) in its upper part, which is in contact with the support plate (11), and comprise electrical contacts that can be upper electrical contacts (25) on the upper face and remain in contact with the longitudinal electrical contact lines of the support plate (11), or they can have lateral electrical contacts (26) that remain in contact with the electrical copper conductors (13) arranged on each lateral inner face;

where the lighting devices comprise at their ends connector covers that allow devices to be connected and to generate a line of light.

In one embodiment of the invention, the connector covers (27) can comprise a joint (28) such as a ball joint to generate changes in direction in the line of light. In another embodiment, the connector covers can be straight covers for straight-line connection, which can also be a continuation of straight covers, in which case they comprise fixing projections (29) on the profile of the device body on both faces, or smooth end covers, in which case they only have fixing projections (29) on one of their faces, the opposite face being flat. These connector covers do not comprise any electrical or electronic means that provide continuity to the different devices, since, as previously mentioned, each lighting device has its own control and electrical means that are independent of each other.

In a possible embodiment of the invention, the bar-shaped device is hung from the ceiling, such that the electrical connection (9) of the power supply module with a power source is integrated into the ceiling hangers (30), the power source being housed within the ceiling.

In a possible embodiment of the invention, the bar is fixed directly to the ceiling, such that the electrical connection (9) of the power supply module with a power source consists of a direct connection with a transformer (32) arranged in a casing (31) over the cover of the body, and where the casing is fixed directly to the ceiling.

The invention claimed is:

1. A lighting device for emitting ambient light and direct light, comprising a longitudinal body and a longitudinal cover; where the longitudinal cover is fixed by pressure on an upper part of the longitudinal body; the lighting device comprising:

a side wall on each side of the longitudinal body, where on an outer face of each side wall is fixed a light strip, which is arranged longitudinally along an entire length of the side wall of the longitudinal body a first diffuser which is fixed to the outer face of each side wall and is superimposed on the light strip along the entire length of the side wall;

a second diffuser which is fixed to the outer face of each side wall and is superimposed on the first diffuser along the entire length of the side wall;

an open channel arranged in the upper part of the longitudinal body, wherein said open channel comprises a programmable control module and a power supply module comprising an electrical connection with a power source; wherein the control module is connected to the light strips; and wherein the power supply module is connected to the control module and to the light strips; and whereby fixing of the longitudinal cover to the longitudinal body closes the open channel;

an inverted U-shaped inner housing formed by inner faces of the side walls of the longitudinal body, wherein at least one luminaire for emitting direct light is fixable, the inverted U-shaped inner housing comprising:

a longitudinal support plate configured to fit into an upper part of the inverted U-shaped inner housing, wherein the longitudinal support plate is connected to the programmable control module and the power supply module, and which comprises a magnetic medium and a lower face provided with a graphite sheet with at least two longitudinal electrical contact lines extended along a length of the longitudinal support plate;

at least one protective piece of an electrical conductor arranged on an upper part of each inner face, wherein the protective piece fixes a position of the longitudinal support plate; and an electrical copper conductor arranged in each of the at least one protective pieces, forming an electrical power line on the inner faces of the side walls along the entire longitudinal body.

2. The lighting device according to claim 1, wherein the outer face of each side wall comprises: a longitudinal groove formed by two T-shaped projections, one upper projection and one lower projection; and a set of protrusions, one protrusion above the upper projection and another protrusion below the lower projection.

3. The lighting device according to claim 2, wherein the light strip is fixed in the longitudinal groove.

4. The lighting device according to claim 2, wherein a section of the first diffuser comprises slits at ends of the first diffuser that fit into the T-shaped projections of at least one of the side walls.

5. The lighting device according to claim 2, wherein a section of the second diffuser comprises slots at ends of the second diffuser that fit into the T-shaped protrusions of at least one of the side walls.

6. The lighting device according to claim 1, wherein a section of the first diffuser is curved and a surface of the first diffuser is smooth.

7. The lighting device according to claim 1, wherein a section of the second diffuser is curved, and wherein an outer surface of the second diffuser is striated and an inner surface of the second diffuser is smooth.

8. The lighting device according to claim 1, wherein a section of the second diffuser is C-shaped with straight edges, and wherein an outer surface of the second diffuser is striated and an inner surface of the second diffuser is smooth.

9. The lighting device according to claim 1, wherein the programmable control module comprises an electronic board and a submodule for remote communication with external electronic devices.

10. The lighting device according to claim 1, wherein on the inner faces of the side walls of the longitudinal body, the inverted U-shaped inner housing comprises a notch in the upper part and a rib comprising a rim, and wherein the notch and the rim form a longitudinal recess wherein the protective piece is fitted.

11. A lighting system for emitting ambient light and direct light, comprising:

a plurality of lighting devices according to claim 1;

a plurality of luminaires that are fixable in the inner housings of the devices, the luminaires that comprising a magnetic connection with the devices, an electronic board in an upper part that remains in contact with the longitudinal support plate, and comprises electrical connection contacts; and wherein the lighting devices comprise connector covers between the lighting devices to generate a line of light.

12. The system according to claim 11, wherein the connector covers comprise a joint for changing a direction in the line of light.

13. The system according to claim 11, wherein the electrical contacts of the luminaires are upper electrical contacts on an upper face and remain in contact with the longitudinal electrical contact lines of the longitudinal support plate.

14. The system according to claim 11, wherein the electrical contacts of the luminaires are lateral electrical contacts that remain in contact with the electrical copper conductors.

15. The system according to claim 11, wherein the lighting device is hung from a ceiling by hangers, and wherein the electrical connection of the power supply module with a power source is integrated into said hangers.

* * * * *